(12) United States Patent
Wendt et al.

(10) Patent No.: US 9,223,041 B2
(45) Date of Patent: *Dec. 29, 2015

(54) THREE-DIMENSIONAL MECHANICAL EARTH MODELING

(71) Applicant: Schlumberger Technology Corporation, Sugar Land, TX (US)

(72) Inventors: Anke S. Wendt, Stavanger (NO); Jalal Khazanehdari, Cambridge (GB); Andreas Enggard Rasmussen, Randaberg (NO); Farid Reza Mohamed, Aberdeen (GB); Kjetil Westeng, Drammen (NO); Arne Voskamp, Beijing (CN); Andrea Murineddu, Stavanger (NO)

(73) Assignee: SCHLUBMERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/927,382

(22) Filed: Jun. 26, 2013

(65) Prior Publication Data

US 2013/0289962 A1     Oct. 31, 2013

Related U.S. Application Data

(63) Continuation-in-part of application No. 12/356,649, filed on Jan. 21, 2009, now Pat. No. 8,577,660.

(60) Provisional application No. 61/023,047, filed on Jan. 23, 2008.

(51) Int. Cl.
*G06G 7/48*     (2006.01)
*G01V 1/28*     (2006.01)

(Continued)

(52) U.S. Cl.
CPC .................. *G01V 1/28* (2013.01); *G01V 1/306* (2013.01); *G01V 11/00* (2013.01); *G01V 1/301* (2013.01); *G01V 2210/66* (2013.01)

(58) Field of Classification Search
CPC ...... G06G 7/58; G01V 11/00; G01V 2210/66
USPC ............................................................ 703/7
See application file for complete search history.

(56) References Cited

U.S. PATENT DOCUMENTS 5,444,619 A    8/1995 Hoskins et al.
5,517,464 A    5/1996 Lerner et al.

(Continued)

FOREIGN PATENT DOCUMENTS

WO    9964896 A1    12/1999
WO    2004/049004 A2    6/2004

(Continued)

OTHER PUBLICATIONS

Dingding Chen, John Quirenin, Harry Smith Jr., Syed Hamid, Jeff Grable, "Neural Network Ensemble Selection using a Multi-Objective Genetic Algorithm in Processing Pulsed Neutron Data" Petrophysics, vol. 46, No. 5 (Oct. 2005) p. 323-334.*

(Continued)

*Primary Examiner* — Dwin M Craig
(74) *Attorney, Agent, or Firm* — Gary Gex

(57) ABSTRACT

A technique includes receiving a first dataset that is indicative of seismic data acquired in a seismic survey of a field of wells and receiving a second dataset that is indicative of wellbore data acquired in a wellbore survey conducted in at least one of the wells. The technique includes determining a mechanical earth model for the field based at least in part on the seismic data and the wellbore data.

17 Claims, 8 Drawing Sheets

(51) Int. Cl.
  *G01V 11/00*  (2006.01)
  *G01V 1/30*  (2006.01)

(56) References Cited

U.S. PATENT DOCUMENTS

| | | | |
|---|---|---|---|
| 5,992,519 | A | 11/1999 | Ramakrishnan et al. |
| 6,138,076 | A | 10/2000 | Graf et al. |
| 6,313,837 | B1 | 11/2001 | Assa et al. |
| 6,411,903 | B2 | 6/2002 | Bush |
| 6,739,165 | B1 | 5/2004 | Strack |
| 7,003,439 | B2 | 2/2006 | Aldred et al. |
| 7,248,259 | B2 | 7/2007 | Fremming |
| 8,577,660 | B2 * | 11/2013 | Wendt et al. ............... 703/10 |
| 2003/0216897 | A1 | 11/2003 | Endres et al. |
| 2004/0064257 | A1 * | 4/2004 | Tobias et al. ............... 702/6 |
| 2004/0256101 | A1 | 12/2004 | Fox et al. |
| 2005/0149307 | A1 | 7/2005 | Gurpinar et al. |
| 2006/0197759 | A1 | 9/2006 | Fremming |
| 2007/0183260 | A1 * | 8/2007 | Lee et al. ............... 367/25 |
| 2007/0255545 | A1 * | 11/2007 | Pita et al. ............... 703/10 |

FOREIGN PATENT DOCUMENTS

| | | | |
|---|---|---|---|
| WO | 2004049216 | A1 | 6/2004 |
| WO | 2009/002872 | A1 | 12/2008 |

OTHER PUBLICATIONS

K. Edlmann, J.M. Somerville, B.G.D. Smart, S.A. Hamilton, B.R. Crawford, "Predicting Rock Mechanical Properties from Wireline Porosities" SPE/ISRM 47344, Jul. 8-10, 1998, pp. 169-175.*
Castagna, et al., "The Link Between Rock Properties and AVO Response", Offset-Dependent Reflectivity: Theory and Practice of Avo Analysis, Investigations in Geophysics, vol. 8, 1993, pp. 135-171.
Gardner, et al., "Formation Velocity and Density—The Diagnostic Basics for Stratigraphic Traps", Geophysics, vol. 39 (6), 1974, pp. 770-780.
Jin, Side, "Characterizing Reservoir by Using Jointly P- and S-wave AVO Analyses", SEG Annual Meeting, Houston, Texas, 1999, 4 pages.
Ozdemir, et al., "Simultaneous Multicomponent AVO Inversion", SEG Annual Meeting, San Antonio, Texas, Sep. 9-14, 2001, 4 pages.
Plumb, R.A., "Influence of composition and texture on the failure properties of clastic rocks", SPE 28022—Rock Mechanics in Petroleum Engineering, Delft, Netherlands, Aug. 29-31, 1994, 8 pages.
Rasmussen, et al., "Simultaneous Seismic Inversion", 66th EAGE Conference & Exhibition, Jun. 7, 2004, pp. 1-4.
Sinha, et al., "Estimation of Formation Stresses Using Radial Variation of the Three Shear Moduli in a Well—A Case Study From a High-Pressure and High-Temperature Field in the Norwegian Continental Shelf", SPE 109842—SPE Annual Technical Conference and Exhibition, Anaheim, California, U.S.A., Nov. 11-14, 2007, 10 pages.
Voigt, et al., "Berechnung der Fließgrenze von Mischkristallen auf Grund der Plastizitätsbedingung für Einkristalle", ZAMM—Journal of Applied Mathematics and Mechanics / Zeitschrift für Angewandte Mathematik und Mechanik, vol. 9 (1), 1929, pp. 49-58.
Xin-Quan, Ma, "Simultaneous inversion of prestack seismic data for rock properties using simulated annealing Read More: http://library.seg.org/doi/abs/10.1190/1.1527087", Geophysics, vol. 67 (6), 2002, pp. 1877-1885.
Spikes, Kyle et al., "From seismic traces to reservoir Properties: Physics-driven inversion," the Leading Edge, Apr. 2008, pp. 459-461, 27.
Verdon, J. et al., "The Effects of Geomechanical Deformation on Seismic Monitoring of CO2 Sequestration," EAGE, First EAGE CO2 Geological Storage Workshop, Abstract, Sep. 29-30, 2008, Budapest, Hungary.
Goodman, H.E. et al., "Reconciling Subsurface Uncertainty With the Appropriate Well Design Using the Mechanical Earth Model (MEM) Approach," SPE 108848, Offshore Europe, Sep. 4-7, 2007, pp. 1-6, Aberdeen, Scotland, U.K.
Elliott, Rob, "Seismic Rock Properties at Cannonball Field," Formation Evaluation Society of T&T Lunch Meeting, Feb. 8, 2007, pp. 1-30, Trinidad & Tobago.
Ozdemir, Huseyin et al., "Rock and reservoir parameters from prestack inversion of surface seismic data," First Break, Oct. 2006, pp. 83-87, vol. 24.
Doyen, P.M., "Seismic pore pressure prediction with uncertainty using a probabilistic mechanical earth model," CSEG National Convention, Abstracts, 2004, pp. 1-4.
Dvorkin, Jack, "Seismic reflections of rock properties," E&P, Nov. 2004, pp. 59-61.
Burianyk, Michael et al., "Amplitude-Vs-Offset and Seismic Rock Property Analysis: A Primer," CSEG Recorder, Feature Article, Nov. 2000, pp. 4-14.
Goodman, H.E. et al., "The Integration of Rock Mechanics, Open Hole Logs and Seismic Geophysics for Petroleum Engineering Applications," SPE/ISRM 47358, SPE/ISRM rock mechanics in petroleum engineering, Eurock 98, Symposium Trondheim, Abstract, Jul. 8-10, 1998, pp. 241-250, Trondheim, NO.
Goodman, H.E., "Formation Mechanical Property Characterization for Engineering and Earth Science Modeling Applications using the Rock Mecahnics Algorithm (RMA)," Int. J. Rock Mech. & Min. Sci., vol. 34, No. 3-4, 1997, Elsevier Science Ltd.
Nakagawa, S. et al., "Laboratory observation of seismic waves in hetergeneous geomaterials," Rock Mechanics Proceedings of the 35th U.S. Symposium, University of Nevada, Reno, Jun. 5-7, 1995, pp. 183-187, Rock Mechanics, Daemen & Schultz (eds), Balkema, Rotterdam.
Young, Paul R., "Seismic Methods Applied to Rock Mechanics," International Society for Rock Mechanics News Journal, 1993, pp. 4-18, vol. 1, No. 3.
Wu, Faquan, "A 3D model of a jointed rock mass and its deformation properties," International Journal of Mining and Geological Engineering, 1988, pp. 169-176, vol. 6.
Johnson, W.S. et al., "Dynamic Rock Properties from in Situ Field Seismic Studies, A Case History," Twelfth Symposium on Rock Mechanics, Chapter 1, 1971, pp. 3-26.
Nickel, M. et al., "Automated PS to PP event registration and estimation of a high-resolution Vp-Vs ratio volume," SEG Conference, Extended Abstract, 2004.
Mavko, G. et al., "The Rock Physics Handbook," First Edition, 1998, pp. 51-53, Cambridge University Press.
Greenberg, M.L., "Shear-wave Velocity Estimation in Porous Rocks: Theoretical Formulation, Preliminary Verification and Applications," Geophysical Prospecting, 1992, pp. 195-209, vol. 40.
Hill, R., "The Elastic Behaviour of a Crystalline Aggregate," Proc. Phys. Soc. London A, Lecture delivered at Bristol Summer School on the Physics of Solids, Sep. 14, 1951, pp. 349-354, vol. 65.
Reuss, A., "Calculation of the liquid limit of mixed crystals based on plasticity conditions of mono-crystals," Mathematik and Mechanik, pp. 1-14, vol. 9, Book 1, Feb. 1939, Budapest.
Indranil Barman, Ahmed Quenes, Makiang Wang, "Fractured Reservoir Characterization Using Streamline-Based Inverse Modeling and Artificial Intelligence Tools" SPE 63067, published Society of Petroleum Engineers Inc., 2000, pp. 1-9.
Combined Search and Examination Report issued in United Kingdom Application No. GB0901075.2 on May 12, 2009, 4 pages.

* cited by examiner

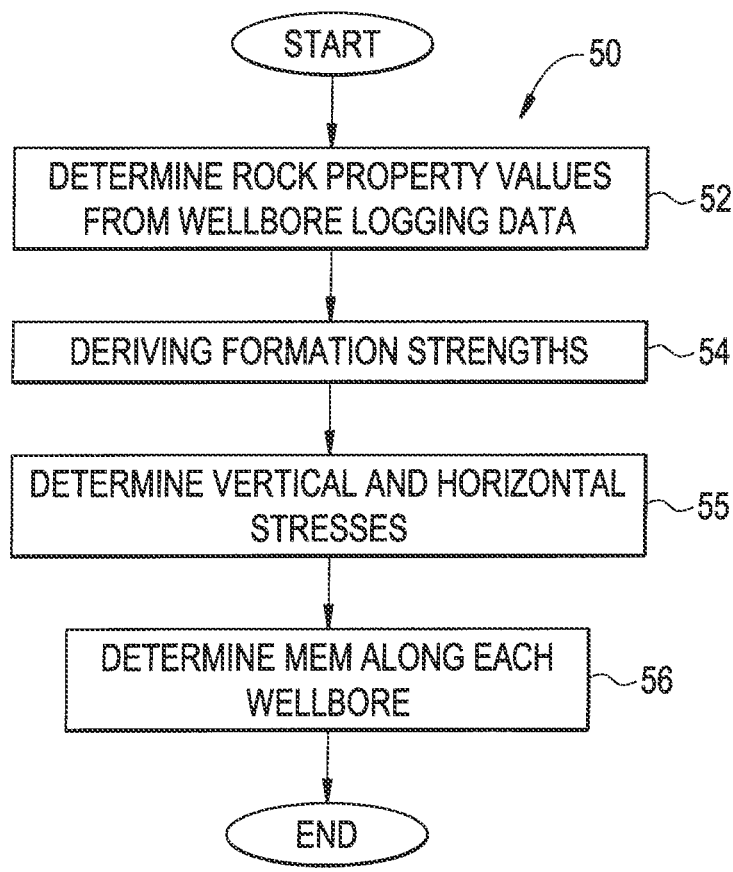

THREE-DIMENSIONAL MECHANICAL EARTH MODELING

This application is a continuation-in-part of U.S. patent application Ser. No. 12/356,649, entitled, "THREE-DIMENSIONAL MECHANICAL EARTH MODELING," which was filed on Jan. 21, 2009(which has now issued as U.S. Pat. No. 8,577,660), and is hereby incorporated by reference in its entirety. This application also claims the benefit under 35 U.S.C. §119(e) to U.S. Provisional Patent Application Ser. No. 61/023,047, entitled, " THREE-DIMENSIONAL MECHANICAL EARTH MODELING," which was filed on Jan. 23, 2008, and is hereby incorporated by reference in its entirety.

BACKGROUND

The invention generally relates to three-dimensional mechanical rock modeling and more particularly relates to high resolution rock property distribution as an integral part of three-dimensional mechanical earth modeling.

Three-dimensional (3-D) rock property modeling may be used to enhance 3D mechanical earth modeling (MEM) of oil or gas reservoirs. Such a model may be particularly useful in developing new and unconventional reservoirs, such as high pressure and high temperature (HPHT) fields, and/or fields which are highly faulted.

When used in time lapse analysis (also called "4-D analysis"), the 3-D MEM with enhanced property predictions supports better wellbore planning and formation integrity forecasting and may be used to characterize more correctly subsidence, compaction, damage to the cap rock integrity and fault sealing. It can also help to determine the maximum depletion and optimum production for a field when coupled to reservoir pressures and field stress developments.

Fields that are characterized by anisotropic rock properties, faults and sealing boundaries in the reservoir, are subjected to differential vertical and horizontal depletion in the reservoir layers during production. This may cause the horizontal principal stresses to deplete differentially, and thus rotate the stresses in space. The differential stress changes may be accompanied by deformation of the reservoir rocks and modified rock properties, which in turn may lead to such effects as rock failure if the rock strength is exceeded, subsidence, compaction, damage of the cap rock integrity, fault sealing, wellbore problems, and sand production. These problems may be avoided by characterizing rock properties with a high lateral and vertical resolution in an adequate 3-D MEM workflow.

SUMMARY

In an embodiment of the invention, a technique includes receiving a first dataset that is indicative of seismic data acquired in a seismic survey of a field of wells and receiving a second dataset that is indicative of wellbore data acquired in a wellbore survey conducted in at least one of the wells. The technique includes determining a mechanical earth model for the field based at least in part on the seismic data and the wellbore data.

In another embodiment of the invention, a system includes an interface to receive a first dataset, which is indicative of a first set of rock properties derived from measurements that are acquired in a seismic survey of a field of wells, and a second dataset, which is indicative of a second set of rock properties of the field independently derived from measurements that are acquired in a wellbore survey conducted in at least one of the wells. The system includes a processor that processes the first and second datasets to determine a mechanical earth model for the field based at least in part on the first dataset and the second dataset.

In yet another embodiment of the invention, an article includes a computer readable storage medium to store instructions that when executed by the computer cause the computer to receive a first dataset and a second dataset. The first dataset is indicative of a first set of rock properties derived from measurements that are acquired in a seismic survey of a field of wells. The second dataset is indicative of a second set of rock properties of the field, which are derived independently from measurements that are acquired in a wellbore survey conducted in at least one of the wells. The instructions when executed by the computer cause the computer to process the first and second datasets to determine the mechanical earth model for the field based at least in part on the first and second datasets.

Advantages and other features of the invention will become apparent from the following drawing, description and claims.

BRIEF DESCRIPTION OF THE DRAWING

FIG. 4 is a flow diagram depicting a technique to determine rock properties from data acquired in wellbore logging surveys according to an embodiment of the invention.

DETAILED DESCRIPTION

Figure 1:
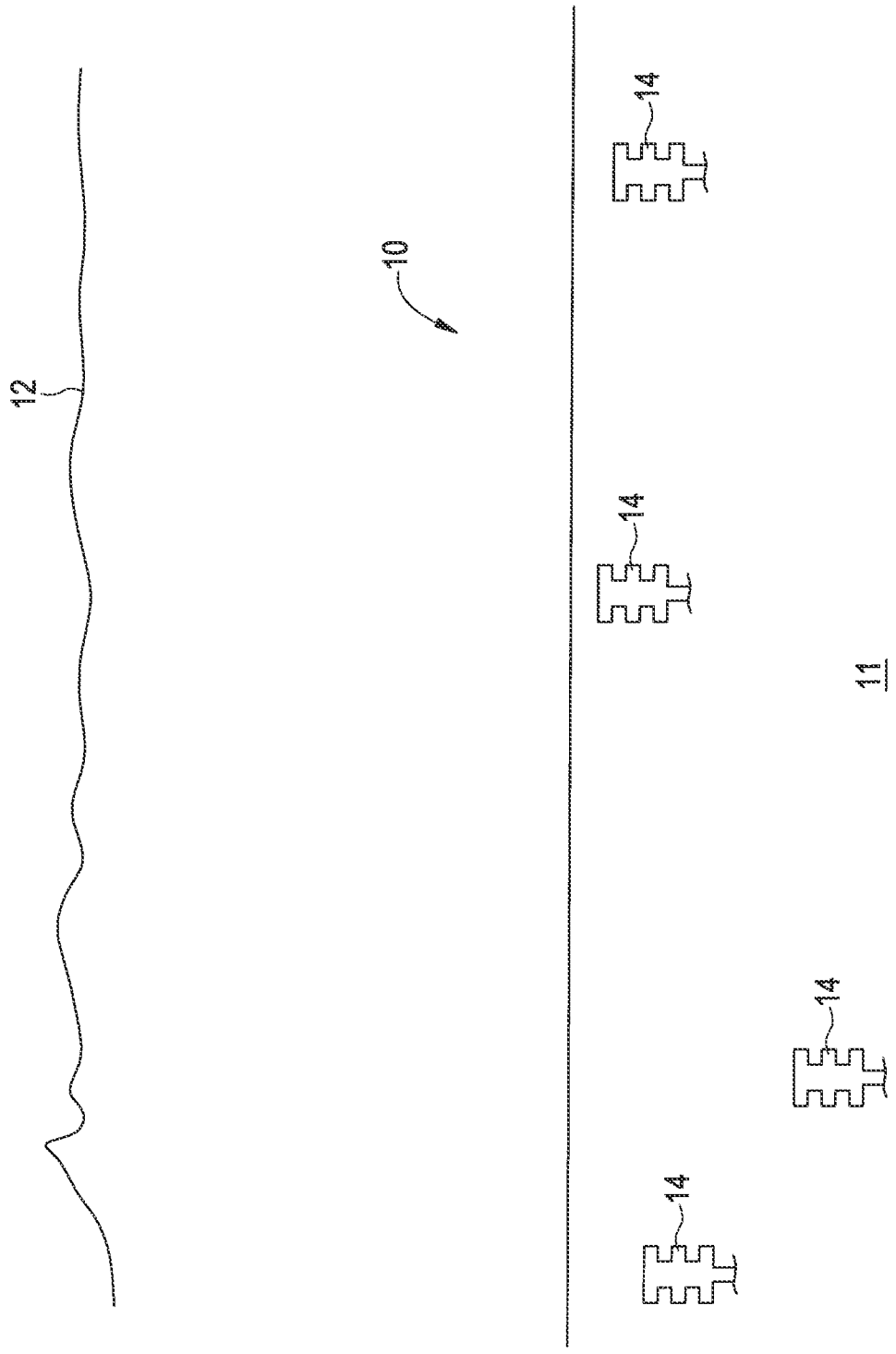
FIG. 1 is a schematic diagram of a subsea well field according to an embodiment of the invention.

Referring to FIG. 1, an exemplary well field 10 includes various subsea wells 14, which are located on a seabed 11 beneath a sea-air surface 12. The measurements acquired in both seismic and wellbore logging surveys of the field 10 are used for purposes of generating high resolution rock properties as part of a three-dimensional (3-D) mechanical earth model (MEM) for the field 10. As described herein, the 3-D MEM rock properties have lateral and spatial resolutions that far exceed the resolutions that are available from a MEM constructed either from well data or from seismic data only. Furthermore, the use of the wellbore calibrated seismic data provides realistic rock property magnitudes and distributions even in areas where limited wellbore-derived information exists.

As non-limiting examples, the seismic survey of the well field 10 may be conducted using a towed marine survey in which one or more surface vessels tow arrays of seismic streamers and sources; or the seismic survey of the field 10 may be conducted using ocean bottom cables (OBCs), which are disposed on the seabed 11. Regardless of the particular seismic survey that is used, rock elastic properties for the entire field 10 may be derived from the seismic survey, although the resolution of the derived properties is relatively low (a resolution of around ten meters (m), as a non-limiting example).

The wellbore logging surveys may be conducted in the wellbore(s) of each of the wells 14 and may be performed, for example, by a wireline or string-deployed logging tool (a sonar-based tool, for example). The logging tool acquires data that allows a relatively higher vertical resolution profile of rock properties along each wellbore to be constructed. However, the profile derived from the well logging data does not span the entire field 10, as the profile is localized to regions near the surveyed wellbores.

Techniques and systems are described herein for purposes of constructing rock deformation and strength properties as part of a 3-D MEM for the field 10, which uses the seismic survey data and well logging survey data to reconstruct regional property trends that honor the structural elements in the field 10 and contains realistic rock property magnitudes and distributions even in areas where only limited wellbore information exists (i.e., in areas beyond the region of interest of each wellbore logging survey, or in areas where wellbores are absent).

It is noted that although a subsea field is described herein as a specific example, it is understood that the techniques and systems that are disclosed herein may likewise be applied to other types of fields, such as land-based fields, for example. Thus, as non-limiting examples, the seismic survey may involve using land-based disposed seismic survey equipment, such as impulse-based seismic survey equipment or a fleet of vibroseis trucks (as non-limiting examples) for purposes of conducting a seismic survey. Thus, many variations are contemplated and are within the scope of the appended claims. Likewise, for these embodiments of the invention, well logging operations may be conducted inside the wellbores of this land-based field.

Figure 2:
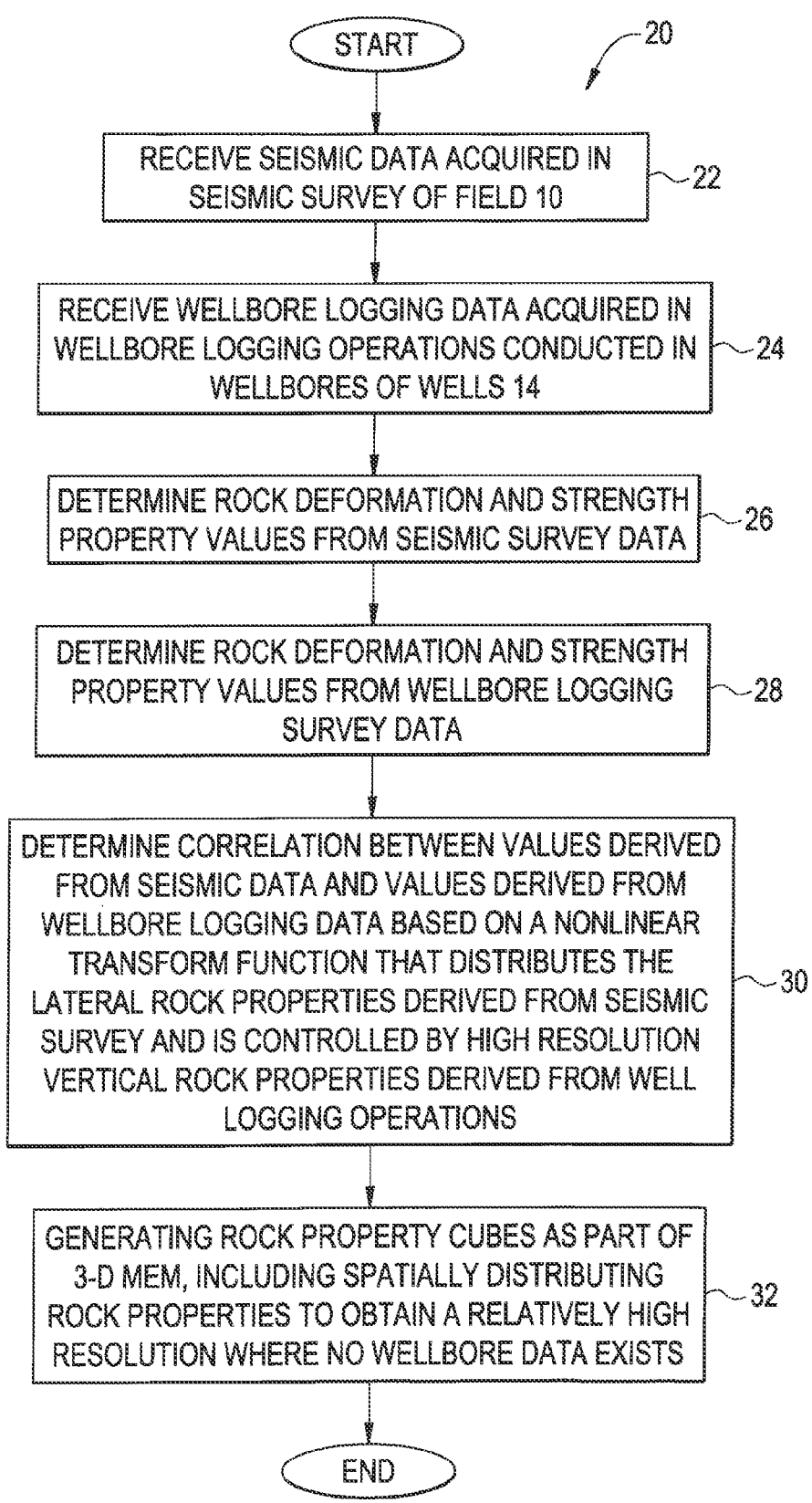
FIG. 2 is a flow diagram depicting a technique to determine rock properties as part of a three-dimensional mechanical earth model according to an embodiment of the invention.

Referring to FIG. 2, in accordance with some embodiments of the invention, an exemplary technique 20 may be used for purposes of generating a 3-D MEM of the oil or gas field 10. Pursuant to the technique 20, seismic data, which were acquired in a seismic survey of the field 10 are received (block 22), as well as wellbore logging data (block 24), which were required in logging operations conducted in the wellbores of the wells 14. Rock deformation and strength property values are determined (block 26) from the seismic data; and rock deformation and strength property values are also determined from the wellbore logging data, pursuant to block 28. A correlation (a non-linear correlation, as a non-limiting example) is then determined, pursuant to block 30, between the rock property values derived from the seismic data and the rock property values derived from the wellbore logging data based on a non-linear transform function that distributes the lateral rock properties derived from the seismic survey and is controlled by the high resolution vertical rock properties derived from the well logging operations. Based on this transform function, structurally controlled rock property cubes are generated as part of the 3-D MEM (block 32). The generation of the property cubes that involves spatially distributing the rock properties to obtain a relatively high resolution over regions where no wellbore data exist.

As a more specific example, in accordance with some embodiments of the invention, relatively large-scale rock elastic properties are derived by simultaneous pre-stack inversion of multicomponent PZ and PS seismic data (acquired from the seismic survey); and relatively small-scale rock elastic rock properties are derived by the inversion of the logging data from wellbores 14 (acquired from the wellbore logging operations). The inverted results may be non-linearly correlated by neural networking (as a non-limiting example of one way to perform the correlation), and the correlation results are used to spatially distribute the rock properties throughout the structurally controlled property cubes of the MEM. In this way, a 3-D full field property model is obtained in which the lateral property resolution is driven by seismic information, and in which the vertical property resolution is driven by upscaled wellbore information.

For embodiments of the invention in which neural networking is used to determine the correlation, the 3-D MEM has rock property values that are nearly identical with the rock values derived from the upscaled well logging data. This is a significant improvement, as compared to wellbore-centered field models. The distribution of the rock properties is controlled by the main structural elements, such as faults, erosional surfaces, layering and topography. The distribution of the rock property has high lateral and vertical resolutions, even in areas where wellbore information is sparse.

In accordance with some embodiments of the invention, the wellbore logging data and the seismic survey data represent a similar state of the field 10, such as an initial state of the field 10 before production begins, for example. It is noted that the techniques and systems that are disclosed herein may be applied to any type of field at any time. The resulting high resolution property cubes as part of the 3D MEM therefore support wellbore planning and formation integrity forecasting and also to help to characterize subsidence and compaction, damage of the cap rock integrity, and fault sealing. If used in a time lapse (4-D) approach, production scenarios can be modeled and forecasted.

Figure 3:
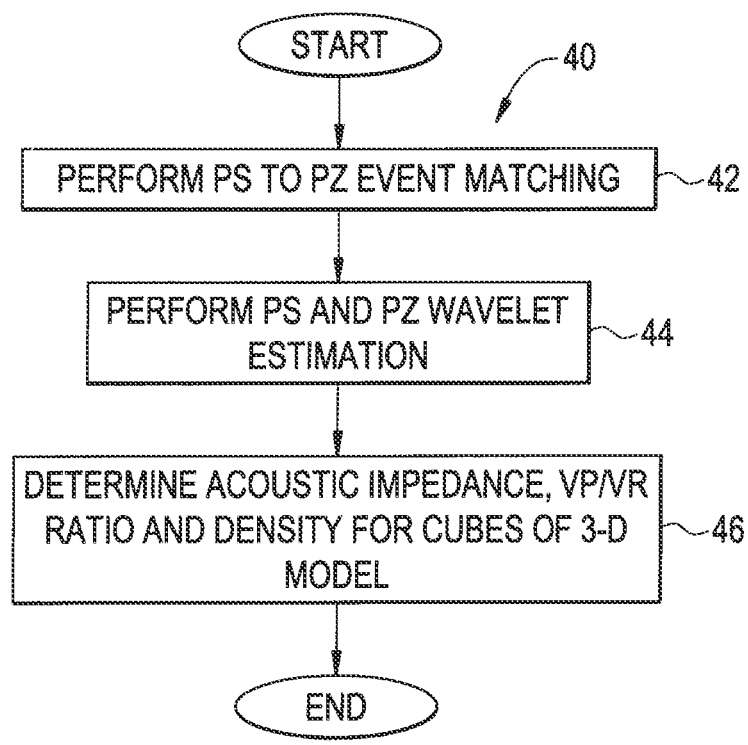
FIG. 3 is a flow diagram depicting a technique to determine rock properties from data acquired in a seismic survey of the well field according to an embodiment of the invention.

As a more specific non-limiting example, in accordance with some embodiments of the invention, the 3-D MEM property cubes are constructed in the following manner. First, a simultaneous inversion technique may be used to estimate elastic rock properties (acoustic impedance, a VpVs ratio and acoustic density, as non-limiting examples) from the seismic data. More specifically, the seismic inversion may use a PS to PZ alignment technique (described below); estimate angle dependent wavelets for all seismic partial stacks; and may use "prior" models that are fully coupled with a 3-D structural frame, which is defined for the ultimate distribution of geomechanical properties throughout the 3-D MEM. Thus, referring to FIG. 3, in accordance with some embodiments of the invention, a technique 40 to process seismic data acquired in a seismic survey of the field 10 includes performing (block 42) PS to PZ event matching and performing (block 44) PS and PV wavelet estimation. Based on the estimated PS and PZ wavelets, the acoustic impedance, VP/VS ratio and density for cubes of the 3-D model may be determined, pursuant to block 46.

The simultaneous inversion involves adequate preparation of the PZ and PS seismic data. In accordance with some embodiments of the invention, both PS and PZ datasets are initially decomposed into angle stacks; common angle spectral equalization is performed to enhance the stability of the seismic bandwidth across the angle range; and residual normal moveout (NMO) is removed by aligning the seismic reflectors while maintaining integrity of the information. Successive PS and PZ seismic angle stacks are aligned, which stretches the PS seismic data to the PZ time scale.

The PS to PZ matching process may be performed by an automated multi-resolution and multiattribute iterative approach, in accordance with some embodiments of the invention. Furthermore, in accordance with some embodiments of the invention, certain attributes may be extracted from the seismic signals, such as reflection strength, intensity, fault attributes, etc. These attributes may be low-pass filtered in an iterative process, in which consecutively higher frequencies are included until the solution converges for the full bandwidth data in the final iteration. Each time, the displacement between the PZ and PS attribute volumes are estimated, and the result is used as the initial "guess" for the next iteration. In this way, robust displacement estimates are achieved without starting with a manually-interpreted initial model.

The PZ and PS data are relatively different in bandwidth and amplitude. Therefore, an extensive quality control of the matched seismic cubes of the model may be performed by comparing seismically-interpreted horizons from both datasets. In areas with large differences, the matching operators are masked, and the excluded area is interpolated from the surroundings.

The outcome of the process is a PS seismic volume stretched to the PZ time scale, thereby allowing a joint inversion of the multi-component dataset.

In order to determine absolute elastic rock properties, "prior" models are introduced into the inversion to compensate for the lack of low-frequency information in the seismic data. In accordance with some embodiments of the invention, the "prior" models are derived by extrapolating the well log data through a high-resolution 3-D structural frame by a kriging-based elastic property distribution, submitted to low-pass filtering. Notably the same structural model, which honors the complex structural and stratigraphic elements of the field such as the dense fault network and the erosional surfaces, may be a key input into the final distribution of the upscaled geomechanical well properties throughout the 3-D MEM. In this way, spatial and vertical consistencies between geological, petrophysical and geophysical data are achieved throughout the workflow.

In accordance with some embodiments of the invention, angle dependent wavelet estimation is performed at the wellbore level and helps to characterize the relative difference in acoustic impedance, VpVs ratio and density between neighboring layers through calculation of the reflectivity coefficient. Wavelets are determined for the PZ and PS angle stacks using a multi-well wavelet estimation with a constant phase constraint.

Simultaneous PZPS seismic inversion, such as the inversion that is described in Nickel, M., Sønneland, L. *Automated PS to PP Event Registration and Estimation of a High-Resolution Vp-Vs Ratio Volume*, SEG Conference, Extended Abstract (2004) (as a nonlimiting example), is performed using the cubes obtained from the PZPS matching, the low-frequency model and the estimated wavelets. The input data may then be inverted for the acoustic impedance, VpVs ratio and density.

As compared to workflows that focus on the inversion of PZ data only, a highly improved match with the wellbore log data is achieved, and improved lateral continuity of the elastic parameters (acoustic impedance, VpVs ratio and density) is achieved. In particular, the density variations are improved due to the wide-angle input, such that a reasonable correlation with the well log data is obtained.

An automated event registration with additional quality control provides reasonable alignment of the PS and PZ seismic datasets. The distribution and magnitudes of rock elastic properties are estimated taking into account the structural elements of the field.

The next step in the construction of the high resolution rock deformation and strength property cubes of the 3-D MEM involves processing of the wellbore logging data to determine rock property values. In accordance with some embodiments of the invention, the wellbore logging surveys may be conducted using a sonar-based tool, and the resulting acoustics-based measurements may be used to characterize formation mechanical properties and formation stresses along the surveyed wellbores. These acoustic measurements may be used to create one dimensional (1-D) mechanical earth models (MEMs) along wellbore trajectories that contain elastic moduli information (with static equivalents), formation strength, and stress predictions. Referring to FIG. 4, thus, in general, a technique 50 to process the wellbore logging data in accordance with embodiments of the invention includes determining (block 50) rock property values from wellbore logging data, deriving (block 54) formation strengths and determining (block 55) vertical and horizontal stresses. The results of these calculations result in a MEM along each wellbore, pursuant to block 56.

Rock mechanical properties and stresses may be obtained from one-dimensional (1-D) and three dimensional (3-D) sonic measurements. Their integration with the full suit of conventional log-data, in-situ and laboratory-based measurements provides accurate knowledge of rock deformation and strength properties at the wellbore level. This helps to constrain safe mud weight windows; forecast bit performance through the overburden; and such knowledge even can aid in distinguishing between the altered near wellbore and undisturbed far field rock characteristics, a determination that is important for completion and perforation.

Homogeneous isotropic rock deformation properties in the reservoir, such as the Poisson ratio (v) (lateral versus axial strain); Young's modulus (E) (uniaxial stress versus normal strain); and bulk and shear moduli (K, G) (K=hydrostatic pressure versus volumetric strain; G=applied stress versus shear strain) may be calculated as follows (equations after Mavko, G., Mukerji, T., and Dvorkin, J., *The Rock Physics Handbook, First Edition,* 51-53. (Cambridge University Press 1998):

$$v = \frac{(V_c^2 - 2V_s^2)}{2(V_c^2 - V_s^2)}, \quad \text{Eq. 1}$$

$$E = \rho \frac{V_c^2(3V_c^2 - 4V_s^2)}{(V_c^2 - V_s^2)}, \quad \text{Eq. 2}$$

$$K = \rho(V_c^2 - 4/3V_s^2), \text{ and} \quad \text{Eq. 3}$$

$$G = \rho V_s^2, \quad \text{Eq. 4}$$

where "Vc" represents the compressional velocity, "Vs" represents the shear velocity, and ρ represents the density.

Similarly, properties may also be calculated for the overburden. However, only limited amounts of log data may be available in the overburden, therefore it may be necessary to improve the overburden slowness and density accuracy.

Various methods may be applied for purposes of quality-control editing the overburden well log data. The log quality control is based on the analyses of the velocity-density relationship. From rock physics theory, it is known that this relationship varies with lithology. Density predictions are not always correct. The empirical relationship between DTCO and density is based on log data from a depth interval, which has a representative velocity versus density relationship for a specific rock formation. Generally, this empirical relationship was established from a linear regression trend.

When P-wave data is available and no S-wave data is available; or when the S-wave data has an insufficient quality, shear slowness predictions may be performed, based on the empirical relationship (herein called the "Greenberg-Castagna" relationship) set forth in M. L. Greenberg and J. P. Castagna, entitled *"Shear-Wave Velocity Estimation In Porous Rocks: Theoretical Formulation, Preliminary Verification And Application,"* Geophysical Prospecting 40: 195-209 (1992). This estimation provides a shear velocity as a function of the equivalent velocities for each solid rock constituents (minerals) individually. The individual results may be averaged, depending on the specific mineral volumes in the rocks using the approach set forth in Voigt-Reuss-Hill (Voigt. W. (1928) Lehrbuch der kristallphysik (1928); Teubner; Reuss. A., *Brechnung der fliessgrense von mischkristallen auf grund der plastizitatsbedinggung für einkristalle*. Zeit. für Ange. Math. Mech. 9, 49-58 (1929); and Hill. R., *The elastic behaviour of a crystalline aggregate*. Proc. Phys. Soc. London A 65, 349-354 (1952).

). Because the Greenberg-Castagna relationship assumes a fully brine-saturated rock, a Vp-only fluid substitution is applied for hydrocarbon-bearing rocks. This allows obtaining a Vs prediction from a fluid corrected Vp.

The empirical VP-VS relationship for a fully brine-saturated rocks with various rock compositions has the following form:

$$V_S = a_{i2} V_P^2 + a_{i1} V_P + a_{i0},\qquad \text{Eq. 5}$$

where "VP" and "VS" are compressional and shear wave velocities in km/s, respectively; and "a" is a mineral-dependent coefficient. The mineral coefficients "a" may be calibrated to VSP data offset wells using a monomineralic model.

The shift in magnitude from dynamic to static rock properties is necessary for correct rock deformation analysis. Dynamic properties may be transformed to static properties in the reservoir using the information from core tests. The relationship between dynamic and static properties may be obtained by cross-plotting dynamic properties from a specific depth versus the core properties from sands and shales at the same depth from the same well. The data may then be linearly correlated. Subsequently, dynamic Young's modulus and Poisson's ratio trends may be shifted towards static values based on the linear equation. Static bulk and shear moduli and the rock strength may be calculated based on the static Young's modulus and Poisson's ratio. Overburden deformation properties may be calibrated from dynamic to static using empirical relationships.

Continuous stress calculations for the undisturbed far field formations parallel to the wellbore path may be performed using for example a Mohr-Coulomb approach or any other approach described in the literature based on overburden stresses, pore pressure profiles and friction angles.

Overburden stress may be calculated by integrating density over depth and taking into account the gravity constant. The reservoir pore pressure profile may be constructed using in-situ pore pressure points (MDT) from exploration drilling that exhibited initial pore pressures, and MDT points directly taken in the reservoir section of each individual production wells. Depleted pore pressures may be slightly lower than the initial pore pressures. The friction angle may be calculated as a linear function of clay content of the reservoir rocks, and checked against core measurements and empirically-derived values.

In the case of using the Mohr Coulomb approach, Mohr Coulomb stress boundaries may be calculated for both pore pressure scenarios (initial, depleted), and then used as a constraint for the stress development with increasing depth. An estimated absolute value for the initial minimum horizontal stress magnitudes (before depletion) may be obtained by assuming that minifrac tests in sands, and extended leak-off tests (XLOTs) and formation integrity tests (FITs) performed on shales in several wells represent the minimum horizontal stress or the lowest limit of the minimum horizontal stress (FIT) for individual depth points. These pressure points may then be correlated with respect to the Mohr Coulomb stress boundaries, e.g. the trend of the averaged lower and upper Mohr-Coulomb boundary may be projected on the positions of the minifrac, XLOT tests and FIT tests in a depth-pressure (or stress) plot.

Subsequently, the same procedure may be used for calculating a minimum horizontal stress profile along the wellbore, which honors the pore pressure depletion in the reservoir sands; and the depleted minimum horizontal stress magnitude may be obtained from stress calculations. Calculations may be undertaken, calibrated by minifrac tests and stress points obtained from Sonic Scanner measurements undertaken in initial or depleted reservoir sands. A continuous maximum horizontal stress profile may be constrained along the wellbore path using a stress ratio analyses from the Sonic Scanner data.

After the seismic data and wellbore logging data are processed to derive the rock properties, the focus in building the 3-D MEM turns to accurately establishing a correlation pattern between the log-derived dynamic elastic rock properties from the wells, and the rock properties derived from the seismic inversion process.

The preparation of the three dimensional structural field model involves a variety of tasks including 3-D structural modeling of the reservoir, overburden and underburden. Reservoir geometry may be derived from the original structural field model; and the overburden and underburden are time-converted depth-horizons. The extended 3-D grid has an average cell size that is kept close to the initial geometry and includes horizons from below the reservoir layers to the seabed and numerous faults. The horizons constitute the upper and lower boundaries of formation zones. Property modeling may be subsequently performed for individual zones.

In accordance with some embodiments of the invention, each zone may be divided into vertical layers of constant thickness, determined by the seismic sampling rate of 4 ms for example (equivalent to about 5 m at target level, as a non-limiting example). In accordance with embodiments of the invention, the structural model is a key input into the 3-D MEM and ensures that the property distribution honors the complex structural and stratigraphic elements of the field, such as dense fault networks, topography and the erosional surfaces.

As mentioned above, neural networking may be used for purposes of determining a correlation between the rock properties derived from the seismic data and well logging datasets. Neural networking is an advanced computer-based procedure that is based on pattern recognition and solving of problems using the recognized patterns. The focus in building a 3-D MEM of elastic rock properties with high vertical and lateral resolution is to accurately establish a correlation pattern between the log-derived dynamic elastic rock properties from the wells, and the rock properties derived from the seismic inversion process. The recognition of a correlation pattern is achieved first, by building a transform function, which represents a non-linear correlation between the seismic and the log derived rock properties. This function may be obtained, for example, from numerous interpolations between wellbore and seismic attributes along the wellbore trajectories until the property solutions converge. Property modeling based on this integrated approach results in a 3-D MEM that uses the high lateral resolution of the log-controlled seismic inversion volumes to guide property distribution into the structural field model.

The results from the seismic neural network-based approach have been compared to results obtained from kriging and stochastic Sequential Gaussian Simulation (SGS) used for the property modeling, which are typically wellbore centered methods and rely on the observation of local property trends and variations around the near wellbore region (through linear geostatistical and variogram analyses) as a primary input for property distribution at regional scale. For a consistent comparison of the different approaches, both methods were used to test (1) for the difference in rock property prediction when using wellbore data only (no secondary variable) and (2) for the differences between neural networking, kriging and SGS when a primary input variable (wellbore data), and the seismic inversion volumes as secondary variable are used.

The comparison of the three model types showed that 1.) neural networking-based technique that is described herein produces a continuous lateral and vertical rock property distribution of high resolution; 2.) the kriging technique without and with seismic data produces a low lateral property resolution distribution; and 3.) the SGS technique without and with seismic data as secondary variable produces a discontinuous and patchy property pattern. In the neural networking-based technique described herein, the property distribution honors the structural features in the field, and even produced realistic results in areas where wellbore information is sparse. The two other techniques (kriging, SGS) produce results that reflect the strong dependency of the modeling on the primary input information (wellbore data), and the linear relationship between wellbore and seismic data is insufficient for wellbore-independent, structurally controlled spatial propagation of the rock properties throughout the model.

Furthermore, the results of neural networking-based technique described herein and secondary variable kriging and SGS were investigated in a blind well test for property magnitude predictions along a wellbore trajectory. In the test, data from one particular well were omitted from the modeling process, before restarting the calculation. This allowed subsequent extraction of the purely modeled rock property along the blinded wellbore trajectory. The prediction output was presented in form of upscaled well logs with a vertical resolution equivalent to the seismic sampling rate (4 ms, approximately 5 m). The neural networking-based technique that is described herein produced an upscaled blind well test log that was nearly identical to the upscaled log from the original data set, whereas, both the kriging with seismic and the SGS with seismic input produced upscaled logs that differed considerably (up to 40%) from the original upscaled log.

The 3-D modeling of rock properties were tested without the spatial information contributed by the seismic inversion results. This approach had to be confined to kriging and SGS, since only these can be utilized with a single variable (wellbore data). Lateral and vertical test results for acoustic impedance variations were determined. Both tests revealed that the 3-D lateral and vertical property distribution and the property magnitudes derived from wellbore data only produces low-confidence results. The kriging predicted nearly constant property values per layer, whereas the SGS predicted highly dispatched results. Magnitude differences of up to 55% were reached between the original well properties and modeled well properties obtained during a blind well test.

To summarize, structurally controlled rock property cubes of a 3-D MEM constructed using the integrated approach described herein has a high regional resolution both in the lateral and vertical directions. The property distribution is controlled by the variation of the structural features in the field. Property predictions may be made for overburden, reservoir and underburden, even in those areas, where wellbore information is sparse or absent. Property predictions are enhanced in absolute magnitudes of more than fifty percent, as compared to traditional wellbore centered approaches. The dynamic rock property cubes may be converted into static rock property cubes by empirical or core calibrations. This allows further derivation of rock strength properties using empirical and/or core based relationships. The property cubes allow the prediction of wellbore stabilities and sanding potentials for any planned wellbore trajectory. Together with the stress profiles from the 1-D MEMs, the property cubes provide input data for 4D stress and strain modeling, which aids in predicting future wellbore problems associated with sand production and rock deformation; subsidence and compaction; damage of the cap rock integrity; and fault sealing that can occur during production of a field.

The above-mentioned seismic survey and wellbore surveys may be conducted in numerous ways, as can be appreciated by one of skill in the art. As just a few non-limiting examples, FIGS. 5A-5D depicts simplified schematic views illustrating a few exemplary ways to conduct these operations in an exemplary field 100 that has a subterranean formation 102 that contains a reservoir 104 therein.

Figure 5A:
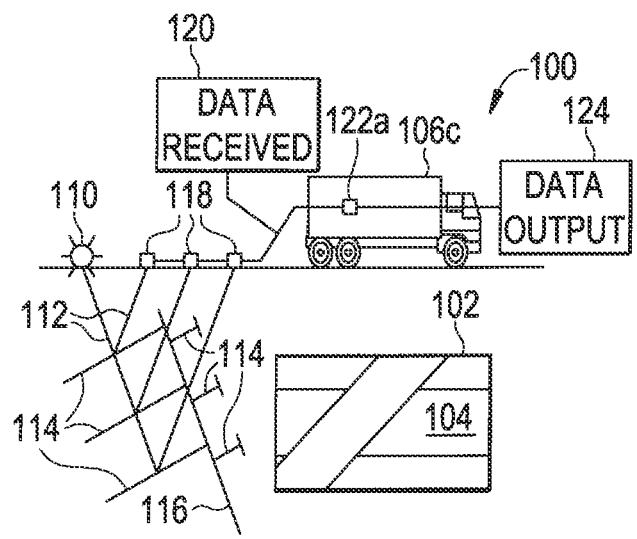
FIG. 5A is a schematic diagram depicting a seismic survey according to an embodiment of the invention.

For embodiments of the invention in which the field 100 is a land-based field, the system depicted in FIG. 5A may be used to perform a seismic survey of the field 100. The system includes a seismic truck 106a to measure properties of the subterranean formation. The survey operation is a seismic survey operation for producing sound vibrations. In FIG. 5A, one such sound vibration, sound vibration 112 generated by a source 110, reflects off horizons 114 in an earth formation 116. A set of sound vibrations, such as sound vibration 112, is received in by sensors, such as geophone-receivers 118, which are situated on the earth's surface. In response to receiving these vibrations, the geophone receivers 118 produce electrical output signals, referred to as data received 120 in FIG. 5A.

In response to the received sound vibration(s) 112 representative of different parameters (such as amplitude and/or frequency) of sound vibration(s) 112, the geophones 118 produce electrical output signals containing data concerning the subterranean formation. Data received 120 is provided as input data to a computer 122a of the seismic truck 106a, and responsive to the input data, a computer 122a generates seismic data output 124. This seismic data output may be stored, transmitted or further processed as desired, for example by data reduction.

The seismic survey may be performed by an impulse-based source or vibroseis-based sources, depending on the particular embodiment of the invention. Furthermore, the geophones 118 may be disposed in wellbores, in other embodiments of the invention. For subsea fields, applicable seismic survey systems may be used, such as marine towed array systems, ocean bottom cable (OBC)-based systems, etc. Thus, many variations are contemplated and are within the scope of the appended claims.

Figure 5B:
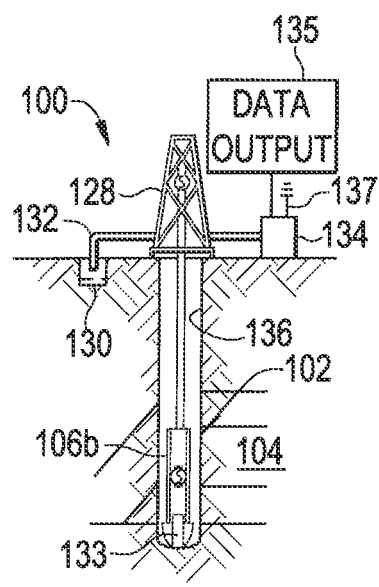
FIG. 5B depicts a drilling operation according to an embodiment of the invention.

The wellbore logging operations may be conducted in numerous ways, depending on the particular embodiment of the invention. As a non-limiting example, FIG. 5B depicts a wellbore logging technique that may be used in accordance with some embodiments of the invention. Although FIG. 5B depicts the operation for a land-based well, these techniques may be used in connection with a subsea well, as can be appreciated by one of skill in the art. More specifically, FIG. 5B depicts a drilling operation being performed by drilling tools 106b, which are suspended by a rig 128 and advanced into the subterranean formations 102 to form a wellbore 136. A mud pit 130 is used to draw drilling mud into the drilling tools via a flow line 132 for circulating drilling mud through the drilling tools, up the wellbore 136 and back to the surface. The drilling mud may be filtered and returned to the mud pit.

A circulating system may be used for storing, controlling, or filtering the flowing drilling muds. The drilling tools are advanced into the subterranean formations 102 to reach the reservoir 104. Each well may target one or more reservoirs. The drilling tools are preferably adapted for measuring downhole properties using logging while drilling tools. The logging while drilling tool may also be adapted for taking a core sample 133, as shown in FIG. 6B, or removed so that a core sample may be taken using another tool.

A surface unit 134 is used to communicate with the drilling tools and/or offsite operations. The surface unit 134 is capable of communicating with the drilling tools to send commands to the drilling tools, and to receive data therefrom. The surface unit 134 is preferably provided with computer facilities for receiving, storing, processing, and/or analyzing data from the oilfield. The surface unit 134 collects data generated during the drilling operation and produces data output 135 which may be stored or transmitted. Computer facilities, such as those of the surface unit 134, may be positioned at various locations about the oilfield and/or at remote locations.

Sensors S, such as gauges, may be positioned about the oilfield to collect data relating to various oilfield operations. As shown in FIG. 5B, sensor S is positioned in one or more locations in the drilling tools and/or at the rig 128 to measure drilling parameters, such as weight on bit, torque on bit, pressures, temperatures, flow rates, compositions, rotary speed, and/or other parameters of the oilfield operation. Sensors S may also be positioned in one or more locations in the circulating system.

The data gathered by the sensors S may be collected by the surface unit 134 and/or other data collection sources for analysis or other processing. The data collected by the sensors S may be used alone or in combination with other data. The data may be collected in one or more databases and/or transmitted on or offsite. All or select portions of the data may be selectively used for analyzing and/or predicting oilfield operations of the current and/or other wellbores. The data may be historical data, real time data, or combinations thereof. The real time data may be used in real time, or stored for later use. The data may also be combined with historical data or other inputs for further analysis. The data may be stored in separate databases, or combined into a single database.

The collected data may be used to perform analysis, such as modeling operations. For example, the seismic data output may be used to perform geological, geophysical, and/or reservoir engineering. The reservoir, wellbore, surface, and/or process data may be used to perform reservoir, wellbore, geological, geophysical, or other simulations. The data outputs from the oilfield operation may be generated directly from the sensors, or after some preprocessing or modeling. These data outputs may act as inputs for further analysis.

The data may be collected and stored at the surface unit 134. One or more of the surface units may be located at oilfield 100, or connected remotely thereto. The surface unit 134 may be a single unit, or a complex network of units used to perform the necessary data management functions throughout the oilfield. The surface unit 134 may be a manual or automatic system. The surface unit 134 may be operated and/or adjusted by a user.

The surface unit 134 may be provided with transceiver 137 to allow communications between the surface unit 134 and various portions of the oilfield 100 or other locations. The surface unit 134 may also be provided with or functionally connected to one or more controllers for actuating mechanisms at the oilfield 100. The surface unit 134 may then send command signals to the oilfield 100 in response to data received. The surface unit 134 may receive commands via the transceiver or may itself execute commands to the controller. A processor may be provided to analyze the data (locally or remotely), make the decisions and/or actuate the controller. In this manner, the oilfield 100 may be selectively adjusted based on the data collected. This technique may be used to optimize portions of the oilfield operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

Figure 5C:
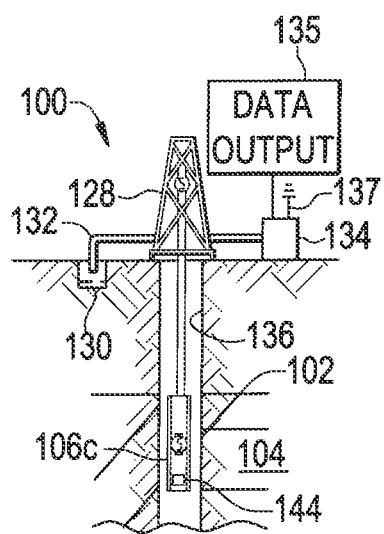
FIG. 5C depicts a wireline operation according to an embodiment of the invention.

FIG. 5C depicts another example of a land-based system that may be used to perform a well logging survey in a land-based well. As can be appreciated by one of skill in the art, the technique depicted in FIG. 5C may be extended to perform a well logging survey in a subsea well. FIG. 5C depicts wireline operation being performed by wireline tool 106c suspended by the rig 128 and into the wellbore 136 of FIG. 5B. The wireline tool 106c is preferably adapted for deployment into a wellbore for generating well logs, performing downhole tests and/or collecting samples. The wireline tool 106c may be used to provide another method and apparatus for performing a seismic survey operation. The wireline tool 106c of FIG. 5C may, for example, have an explosive, radioactive, electrical, or an acoustic energy source 144 that sends and/or receives electrical signals to surrounding subterranean formations 102 and fluids therein.

The wireline tool 106c may be operatively connected to, for example, geophones 118 and a computer 122a of the seismic truck 106a of FIG. 5A. The wireline tool 106c may also provide data to surface unit 134. Surface unit 134 collects data generated during the wireline operation and produces data output 135 that may be stored or transmitted. The wireline tool 106c may be positioned at various depths in the wellbore to provide a survey or other information relating to the subterranean formation.

Sensors S, such as gauges, may be positioned about oilfield 100 to collect data relating to various oilfield operations as described previously. As shown, the sensor S is positioned in wireline tool 106c to measure downhole parameters which relate to, for example porosity, permeability, fluid composition and/or other parameters of the oilfield operation.

Figure 5D:
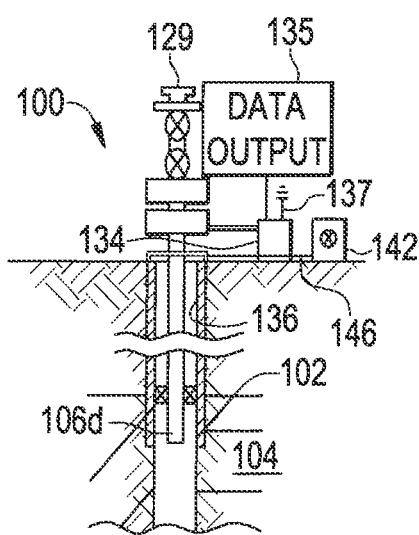
FIG. 5D depicts a production operation according to an embodiment of the invention.

As another example, FIG. 5D depicts a production operation being performed by a production tool 106d deployed from a production unit or a Christmas tree 129 and into completed wellbore 136 of FIG. 5C for drawing fluid from the downhole reservoirs into surface facilities 142. Fluid flows from reservoir 104 through perforations in the casing (not shown) and into the production tool 106d in the wellbore 136 and to the surface facilities 142 via a gathering network 146.

Sensors S, such as gauges, may be positioned about the oilfield 100 to collect data relating to various oilfield operations as described previously. As shown, the sensor S may be positioned in the production tool 106d or associated equipment, such as the Christmas tree 129, the gathering network 146, the surface facility 142, and/or the production facility, to measure fluid parameters, such as fluid composition, flow rates, pressures, temperatures, and/or other parameters of the production operation.

While only simplified wellsite configurations are shown, it will be appreciated that the oilfield may cover a portion of land, sea, and/or water locations that hosts one or more wellsites. Production may also include injection wells (not shown) for added recovery. One or more gathering facilities may be operatively connected to one or more of the wellsites for selectively collecting downhole fluids from the wellsite(s).

While FIGS. 5B-5D depict tools used to measure properties of an oilfield, it will be appreciated that the tools may be used in connection with non-oilfield operations, such as mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors S may be located at various positions along the wellbore and/or the monitoring tools to collect and/or monitor the desired data. Other sources of data may also be provided from offsite locations.

The oilfield configuration of FIGS. 5A-5D are intended to provide a brief description of an example of an oilfield in accordance with embodiments of the invention. Part, or all, of oilfield 100 may be on land, water, and/or sea. Also, while a single oilfield measured at a single location is depicted, the present invention may be utilized with any combination of one or more oilfields, one or more processing facilities and one or more wellsites.

Figure 6A:
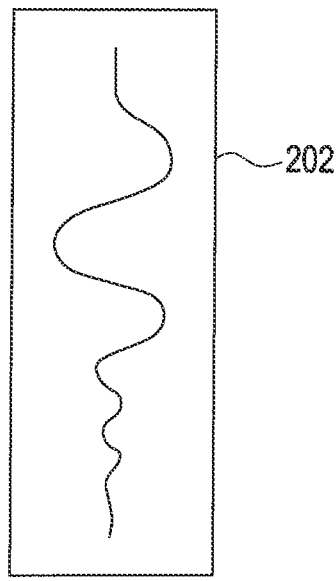
FIG. 6A depicts an exemplary seismic trace acquired during the seismic survey depicted in FIG. 5A according to an embodiment of the invention.
Figure 6B:
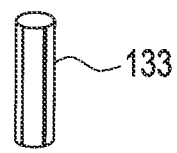
FIG. 6B depicts a core sample acquired in the drilling operation depicted in FIG. 5B according to an embodiment of the invention.
Figure 6C:
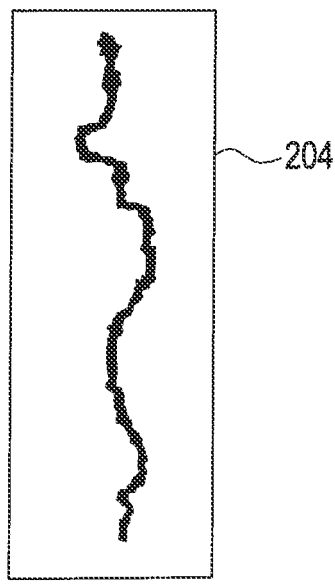
FIG. 6C depicts an exemplary well log acquired in the wireline operation depicted in FIG. 5C according to an embodiment of the invention.
Figure 6D:
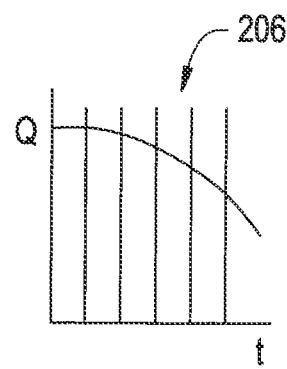
FIG. 6D depicts an exemplary production decline graph acquired in the production operation depicted in FIG. 5D according to an embodiment of the invention.

FIGS. 6A-6D are graphical depictions of examples of data collected by the tools of FIGS. 5A-5D, respectively. FIG. 6A depicts a seismic trace 202 of the subterranean formation of FIG. 5A taken by the seismic truck 106a. The seismic trace 202 may be used to provide data, such as a two-way response over a period of time. FIG. 6B depicts a core sample 133 taken by the drilling tools 106b. The core sample 133 may be used to provide data, such as a graph of the density, porosity, permeability, or other physical property of the core sample over the length of the core. Tests for density and viscosity may be performed on the fluids in the core at varying pressures and temperatures. FIG. 6C depicts a well log 204 of the subterranean formation of FIG. 5C taken by the wireline tool 106c. The wireline log typically provides a resistivity or other measurement of the formation at various depts. FIG. 6D depicts a production decline curve or graph 206 of fluid flowing through the subterranean formation of FIG. 5D measured at the surface facilities 142. The production decline curve typically provides the production rate Q as a function of time t.

The respective graphs of FIGS. 6A-6C depict examples of static measurements that may describe or provide information about the physical characteristics of the formation and reservoirs contained therein. These measurements may be analyzed to better define the properties of the formation(s) and/or determine the accuracy of the measurements and/or for checking for errors. The plots of each of the respective measurements may be aligned and scaled for comparison and verification of the properties.

FIG. 6D depicts an example of a dynamic measurement of the fluid properties through the wellbore. As the fluid flows through the wellbore, measurements are taken of fluid properties, such as flow rates, pressures, composition, etc. As described below, the static and dynamic measurements may be analyzed and used to generate models of the subterranean formation to determine characteristics thereof. Similar measurements may also be used to measure changes in formation aspects over time.

Figure 7:
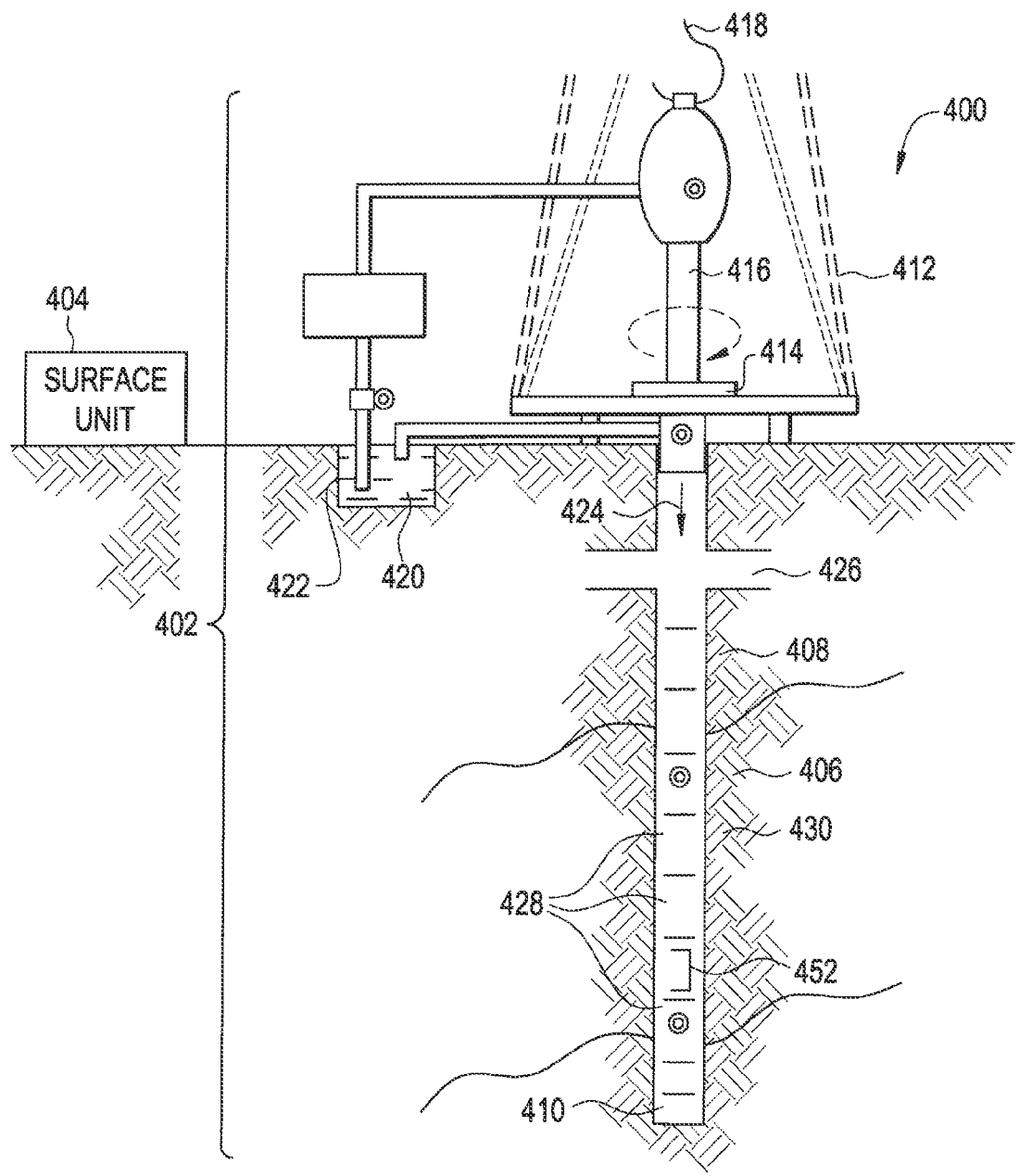
FIG. 7 is a schematic diagram depicting a drilling operation according to an embodiment of the invention.

As yet another example, FIG. 7 is a schematic view of a wellsite 400, depicting a drilling operation, such as the drilling operation of FIG. 5B, of an oilfield in detail. The wellsite 400 includes a drilling system 402 and a surface unit 404. In the illustrated embodiment, a borehole 406 is formed by rotary drilling in a manner that is well known. Those of ordinary skill in the art given the benefit of this disclosure will appreciate, however, that the drilling application may involve a drilling operation other than conventional rotary drilling (e.g., mud-motor based directional drilling), and is not limited to land-based rigs.

The drilling system 402 includes a drill string 408 that is suspended within borehole 406 with the drill bit 410 at its lower end. The drilling system 402 also includes the land-based platform and derrick assembly 412, which are positioned over the borehole 406 penetrating subsurface formation F. The assembly 412 includes a rotary table 414, a kelly 416, a hook 418, and a rotary swivel 419. The drill string 408 is rotated by rotary table 414 (energized by means not shown), which engages a kelly 416 at the upper end of the drill string. The drill string 408 is suspended from a hook 418; and is attached to a traveling block (also not shown) through kelly 416, and rotary swivel 419 which permits rotation of the drill string relative to the hook.

The drilling system 402 further includes drilling fluid or mud 420, which is stored in a pit 422 formed at the well site. A pump 424 delivers the drilling fluid 420 to the interior of the drill string 408 via a port in the swivel 419, inducing the drilling fluid to flow downwardly through the drill string 408, as indicated by directional arrow 424. The drilling fluid exits drill string 408 via ports in drill bit 410, and then circulates upwardly through the region between the outside of drill string 408 and the wall of borehole 406, called the annulus 426. In this manner, drilling fluid lubricates the drill bit 410 and carries formation cuttings up to the surface as it is returned to the pit 422 for recirculation.

The drill string 408 further includes a bottom hole assembly (BHA) 430, generally referenced, near drill bit 410 (in other words, within several drill collar lengths from the drill bit). The bottom hole assembly 430 includes capabilities for measuring, processing, and storing information, as well as communicating with the surface unit 404. The bottom hole assembly 430 further includes drill collars 428 for performing various other measurement functions.

The sensors S are located about the wellsite 400 to collect data, preferably in real time, concerning the operation of wellsite 400, as well as conditions at wellsite 400. The sensors S of FIG. 7 may be the same as sensors S of FIGS. 5A-D. The sensors S of FIG. 7 may also have features or capabilities, of monitors, such as cameras (not shown), to provide pictures of the operation. The sensors S, which may include surface sensors or gauges, may be deployed about the surface systems to provide information about the surface unit 404, such as standpipe pressure, hookload, depth, surface torque, and rotary rpm, among others. In addition, the sensors S, which include downhole sensors or gauges, are disposed about the drilling tool and/or wellbore to provide information about downhole conditions, such as wellbore pressure, weight on bit, torque on bit, direction, inclination, collar rpm, tool temperature, annular temperature and toolface, among others. The information collected by the sensors and cameras is conveyed to the various parts of the drilling system and/or the surface control unit.

The drilling system 402 is operatively connected to the surface unit 404 for communication therewith. The bottom hole assembly 430 is provided with a communication subassembly 452 that communicates with the surface unit 404. The communication subassembly 452 is constructed to send signals to and receive signals from the surface using mud pulse telemetry. The communication subassembly 452 may include, for example, a transmitter that generates a signal, such as an acoustic or electromagnetic signal, which is representative of the measured drilling parameters. Communication between the downhole and surface systems is depicted as being mud pulse telemetry, such as the one described in U.S. Pat. No. 5,517,464, which is assigned to the assignee of the present invention. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

Figure 8:
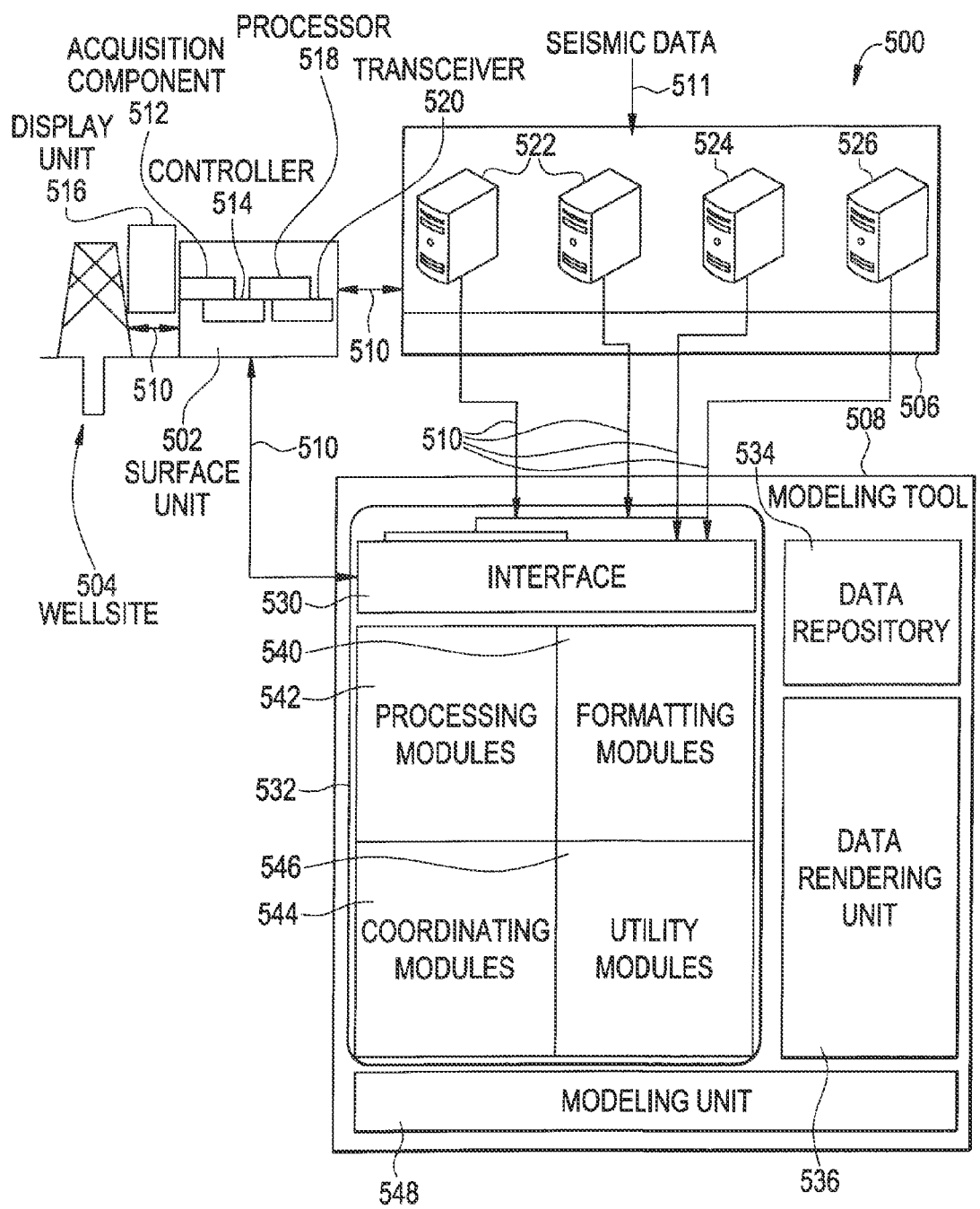
FIG. 8 is a schematic diagram depicting a system according to an embodiment of the invention.

FIG. 8 is a schematic view of a system 500 that may be used in accordance with some embodiments of the invention for purposes of constructing a 3-D MEM. For this example, the system 500 includes multiple surface units 502 (one of which is depicted in FIG. 8), each of which receives well logging data from an associated well site 504, preprocesses the data and communicates the preprocessed data to servers 506. The servers 506 also receive seismic data (as indicated at arrow 511) acquired in a seismic survey of the field. The seismic data 511 may or may not be preprocessed. The wellbore logging and seismic data are provided to a modeling tool 508, which is operatively linked to servers 506.

The modeling tool 508 may be software based and thus, may be formed from software instructions that are stored in a memory of a computer and executed by one or more microprocessors of the computer, in accordance with some embodiments of the invention.

As shown in FIG. 8, communication links 510 are provided between the wellsite 504, the surface unit 502, the servers 506, and the modeling tool 508. A variety of links may be provided to facilitate the flow of data through the system. The communication links may provide for continuous, intermittent, one-way, two-way, and/or selective communication throughout the system 500. The communication links may be of any type, such as wired, wireless, etc.

As shown in FIG. 8, the surface unit 502 may include an acquisition component 512, a controller 514, a display unit 516, a processor 518 and a transceiver 520. The acquisition component 512 collects and/or stores data of the field. This data may be data measured by the sensors S of the wellsite as described above. This data may also be data received from other sources.

The controller 514 is constructed to enact commands at oilfield 500. The controller 514 may be provided with actuation means that can perform drilling operations, such as steering, advancing, or otherwise taking action at the wellsite. Drilling operations may also include, for example, acquiring and analyzing oilfield data, modeling oilfield data, managing existing oilfields, identifying production parameters, maintenance activities, or any other actions. Commands may be generated based on logic of a processor 518, or by commands received from other sources. The processor 518 is preferably provided with features for manipulating and analyzing the data. The processor 518 may be provided with additional functionality to perform oilfield operations.

A display unit 516 may be provided at wellsite 504 and/or remote locations for viewing oilfield data. The oilfield data displayed may be raw data, processed data, and/or data outputs generated from various data. The display is preferably adapted to provide flexible views of the data, so that the screens depicted may be customized as desired.

The transceiver 520 provides a means for providing data access to and/or from other sources. The transceiver 520 also provides a means for communicating with other components, such as the servers 506, the wellsite 504, the surface unit 502, and/or modeling tool 508.

The server 506 may be used to transfer the well logging survey data and the seismic survey data to modeling tool 508. As shown, the servers 506 includes onsite servers 522, a remote server 524, and a third party server 526. The onsite servers 522 may be positioned at the wellsites 504 and/or other locations for distributing data from surface unit 502. The remote server 524 is positioned at a location away from the oilfield 504 and provides data from remote sources. The third party server 526 may be onsite or remote, but is operated by a third party, such as a client.

The servers 506 are constructed to transfer seismic survey data; wellbore logging data; transfer drilling data, such as logs, drilling events, trajectory; and/or other oilfield data, such as seismic data, historical data, economics data, or other data that may be of use during analysis. The type of server is not intended to limit the invention, as the system 500 is constructed to function with any type of server that may be employed.

The servers 506 communicate with the modeling tool 508 as indicated by communication links 510 therebetween. As indicated by the multiple arrows, the servers 506 may have separate communication links with the modeling tool 508. One or more of the servers 506 may be combined or linked to provide a combined communication link.

The servers 506 collect a wide variety of data, including the wellbore logging-derived data and the seismic survey-derived data. The data from the servers 506 is communicated to the modeling tool 508 for processing. Servers 506 may be used to store and/or transfer data.

The modeling tool 508 is operatively linked to the surface unit 502 for receiving data therefrom. In some cases, the modeling tool 508 and/or the server(s) 506 may be positioned at the wellsite 504. The modeling tool 508 and/or the server(s) 506 may also be positioned at various locations. The modeling tool 508 may be operatively linked to the surface unit 502 via server(s) 506. The modeling tool 508 may also be included in or located near the surface unit 502.

The modeling tool 508 includes an interface 530, a processing unit 532, a modeling unit 548, a data repository 534 and a data rendering unit 536. The interface 530 communicates with other components, such as the servers 506. The interface 530 may also permit communication with other oilfield or non-oilfield sources. The interface 530 receives the data and maps the data for processing. The data from the servers 506 typically streams along predefined channels which may be selected by the interface 530.

As depicted in FIG. 8, interface 530 selects the data channel of server(s) 506 and receives the data. Interface 530 also maps the data channels to the seismic survey and wellbore survey data. The data may then be passed to the processing unit of modeling tool 508. Preferably, the data is immediately incorporated into the modeling tool 508 for real-time sessions or modeling. Interface 530 creates data requests (for example surveys, logs, and risks), displays the user interface, and handles connection state events. The interface 530 also instantiates the data into a data object for processing.

The processing unit 532 includes formatting modules 540, processing modules 542, coordinating modules 544, and utility modules 546. These modules are designed to manipulate the oilfield data for real-time analysis. The processing modules 542 may be formed from one or more microprocessors and/or microprocessor systems, depending on the particular embodiment of the invention.

The formatting modules 540 are used to conform the data to a desired format for processing. Incoming data may need to be formatted, translated, converted or otherwise manipulated for use. The formatting modules 540 are configured to enable the data from a variety of sources to be formatted and used so that it processes and displays in real time.

The formatting modules 540 include components for formatting the data, such as a unit converter and the mapping components. The unit converter converts individual data points received from the interface 530 into the format expected for processing. The format may be defined for specific units, provide a conversion factor for converting to the desired units, or allow the units and/or conversion factor to be defined. To facilitate processing, the conversions may be suppressed for desired units.

The mapping component maps data according to a given type or classification, such as a certain unit, log mnemonics, precision, max/min of color table settings, etc. The type for a given set of data may be assigned, particularly when the type is unknown. The assigned type and corresponding map for the data may be stored in a file (e.g. XML) and recalled for future unknown data types.

The coordinating modules 544 orchestrate the data flow throughout modeling tool 508. The data is manipulated so that it flows according to a choreographed plan. The data may be queued and synchronized so that it processes according to a timer and/or a given queue size. The coordinating modules 544 include the queuing components, the synchronization components, the management component, modeling tool 508 mediator component, the settings component, and the real-time handling component.

The queuing module groups the data in a queue for processing through the system. The system of queues provides a certain amount of data at a given time so that it may be processed in real time.

The synchronization component links certain data together so that collections of different kinds of data may be stored and visualized in the modeling tool 508 concurrently. In this manner, certain disparate or similar pieces of data may be choreographed so that they link with other data as it flows through the system. The synchronization component provides the ability to selectively synchronize certain data for processing. For example, log data may be synchronized with trajectory data. Where log samples have a depth that extends beyond the wellbore, the samples may be displayed on the canvas using a tangential projection so that, when the actual trajectory data is available, the log samples will be repositioned along the wellbore. Alternatively, incoming log samples that aren't on the trajectory may be cached so that, when the trajectory data is available, the data samples may be displayed. In cases where the log sample cache fills up before the trajectory data is received, the samples may be committed and displayed.

The settings component defines the settings for the interface. The settings component may be set to a desired format and adjusted as necessary. The format may be saved, for example, in an extensible markup language (XML) file for future use.

The real-time handling component instantiates and displays the interface and handles its events. The real-time handling component also creates the appropriate requests for channel or channel types, handles the saving and restoring of the interface state when a set of data or its outputs is saved or loaded.

The management component implements the required interfaces to allow the module to be initialized by and integrated for processing. The mediator component receives the data from the interface. The mediator caches the data and combines the data with other data as necessary. For example, incoming data relating to trajectories, risks, and logs may be added to wellbores stored in the modeling tool 508. The mediator may also merge data, such as survey and log data.

Utility modules 546 provide support functions to the drilling system. The utility modules 546 include the logging component and the user interface (UI) manager component. The logging component provides a common call for all logging data. This module allows the logging destination to be set by the application. The logging module may also be provided with other features, such as a debugger, a messenger, and a warning system, among others. The debugger sends a debug message to those using the system. The messenger sends information to subsystems, users, and others. The information may or may not interrupt the operation and may be distributed to various locations and/or users throughout the system. The warning system may be used to send error messages and warnings to various locations and/or users throughout the system. In some cases, the warning messages may interrupt the process and display alerts.

The UI manager component creates user interface elements for displays. The UI manager component defines user input screens, such as menu items, context menus, toolbars, and settings windows. The user manager may also be used to handle events relating to these user input screens.

The processing modules 542 are used to analyze the data and generate outputs. The processing modules 542 include a trajectory management component. The trajectory management component handles the case when the incoming trajectory information indicates a special situation or requires special handling (such as the data pertains to depths that are not strictly increasing or the data indicates that a sidetrack borehole path is being created). For example, when a sample is received with a measured depth shallower than the hole depth, the trajectory module determines how to process the data. The trajectory module may ignore all incoming survey points until the MD exceeds the previous MD on the wellbore path, merge all incoming survey points below a specified depth with the existing samples on the trajectory, ignore points above a given depth, delete the existing trajectory data and replace it with a new survey that starts with the incoming survey station, create a new well and set its trajectory to the incoming data, and add incoming data to this new well, and prompt the user for each invalid point. All of these options may be exercised in combinations and can be automated or set manually.

The processing modules 542, in accordance with embodiments of the invention, processes the wellbore logging survey data and the seismic survey data to perform at least parts of one or more of the techniques 20 (FIG. 2), 40 (FIG. 3) or 50 (FIG. 4) that are disclosed herein. This processing may be performed, for example, by the computer execution of program instructions that are stored in a memory of a computer. In general, the processing modules 542 may, as examples, process the wellbore logging survey data to determine a first set of rock values, process the seismic survey data to independently determine a second set of rock values, determine a correlation between the first and second set of rock values (such as a technique that uses neural networking, for example), use the correlation to spatially distribute rock property values to derive a 3-D MEM, etc.

The data repository 534 stores the data for the modeling unit 548. The data is preferably stored in a format available for use in real-time. The data is passed to the data repository 534 from the processing component. It can be persisted in the file system (e.g., as an XML File) or in a database. The system determines which storage is the most appropriate to use for a given piece of data and stores the data there in a manner which enables automatic flow of the data through the rest of the system in a seamless and integrated fashion. It also facilitates manual and automated workflows (such as modeling, geological & geophysical ones) based upon the persisted data.

The data rendering unit 536 provides one or more displays for visualizing the data. The data rendering unit 536 may contain a 3-D canvas, a well section canvas or other canvases as desired. The data rendering unit 536 may selectively display any combination of one or more canvases. The canvases may or may not be synchronized with each other during display. The display unit is preferably provided with mechanisms for actuating various canvases or other functions in the system.

While specific components are depicted and/or described for use in the modules of the modeling tool 508, it will be appreciated that a variety of components with various functions may be used to provide the formatting, processing, utility, and coordination functions necessary to provide real-time processing in modeling tool 508. The components and/or modules may have combined functionalities.

The modeling unit 548 performs the key modeling functions for generating complex oilfield outputs. Modeling unit 548 may perform modeling functions, such as generating, analyzing, and manipulating earth models. The earth models typically contain exploration and production data.

Other embodiments of the invention are contemplated. For example, in accordance with some embodiments of the invention, the full 3DMEM also includes stress calculations. As another example, although neural networking is described herein, a rock property distribution technique other than neural networking may be used in other embodiments of the invention, as this other rock property distribution technique may possibly provide better results for the given field. Thus, many variations are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   receiving a first dataset indicative of seismic data acquired in a seismic survey of a field of wells;
   receiving a second dataset indicative of wellbore data acquired in a wellbore survey conducted in at least one of the wells; and
   determining a mechanical earth model including rock deformation and strength properties for the field based at least in part on the seismic data and the wellbore data using at least one processor, including using the seismic data and the wellbore data to spatially distribute at least one rock mechanical property over a region of the field in the model where wellbore data is sparse or non-existent, wherein the act of determining the mechanical earth model comprises:
   determining a first set of rock mechanical properties based on the seismic data
   independently determining a second set of rock mechanical properties based on the wellbore data; and
   determining a correlation between the first and second sets of rock mechanical properties, wherein the correlation comprises a nonlinear correlation.

2. The method of claim 1, further comprising:
   spatially distributing rock mechanical properties within the model based on the determined correlation such that a lateral rock property of the region in the model is derived from the seismic data and such that a vertical rock property of the region is derived from the wellbore data.

3. The method of claim 1, wherein the act of determining the correlation comprises applying a pattern matching technique to determine the correlation.

4. The method of claim 3, wherein the act of applying the pattern matching technique comprises performing neural networking.

5. The method of claim 1, wherein the act of determining the correlation comprises determining a correlation between elastic rock properties determined from the seismic data and deformation properties determined from the wellbore data.

6. The method of claim 1, wherein the act of determining the first set of rock mechanical properties comprises performing an inversion of the seismic data, and the act of determining the second set of rock mechanical properties comprises performing an inversion of the wellbore data.

7. The method of claim 1, wherein the correlation comprises a nonlinear correlation.

8. The method of claim 1, wherein the wellbore data is acquired by at least one wellbore logging tool.

9. The method of claim 1, wherein the at least one rock mechanical property is selected from the group consisting of elastic moduli information, formation strength, vertical stress, horizontal stress, Poisson ratio, Young's modulus, bulk modulus, and shear modulus, and wherein the method further comprises:
   predicting a stability of at least one of the wellbores based on the mechanical earth model.

10. The method of claim 1, further comprising:
    predicting a sanding potential for at least one of the wellbores based on the mechanical earth model.

11. A system comprising:
    an interface to receive a first dataset indicative of a first set of rock mechanical properties derived from measurements acquired in a seismic survey of a field of wells and a second dataset indicative of a second set of rock mechanical properties of the field independently derived from measurements acquired in a wellbore survey conducted in at least one of the wells; and a processor to determine a mechanical earth model including rock deformation and strength properties for the field based at least in part on the first dataset and the second dataset, including using the first dataset and the second dataset to spatially distribute at least one rock mechanical property over a region of the field in the model where wellbore data is sparse or non-existent, wherein the processor is adapted to process the first dataset and the second data set to determine a correlation between the first and second sets of rock mechanical properties, wherein the correlation comprises a nonlinear correlation.

12. The system of claim 11, wherein the processor is adapted to apply the determined correlation to spatially distribute rock mechanical properties within the model such that a lateral rock property of the region in the model is derived from the first dataset and such that a vertical rock property of the region is derived from the second dataset.

13. The system of claim 11, wherein the processor is adapted to apply a neural networking technique to determine the correlation.

14. The system of claim 11, wherein the measurements acquired in the wellbore survey comprise measurements acquired by at least one wellbore logging tool.

15. An article comprising a non-transitory computer readable storage medium to store instructions that when executed by a computer cause the computer to:

receive a first dataset indicative of a first set of rock mechanical properties derived from measurements acquired in a seismic survey of a field of wells;

receive a second dataset indicative of a second set of rock mechanical properties of the field independently derived from measurements acquired in a wellbore survey conducted in at least one of the wells; and process the first dataset and the second dataset to determine a mechanical earth model including rock deformation and strength properties for the field based at least in part on the first dataset and the second dataset, including using the first dataset and the second dataset to spatially distribute at least one rock mechanical property over a region of the field in the model where wellbore data is sparse or non-existent, the storage medium storing instructions that when executed cause the computer to process the first dataset and the second dataset to determine a correlation between the first and second sets of rock mechanical properties, wherein the correlation comprises a nonlinear correlation.

16. The article of claim 15, the storage medium storing instructions that when executed cause the computer to apply the determined correlation to spatially distribute rock mechanical properties within the model such that a lateral rock property of the region in the model is derived from the first dataset and such that a vertical rock property of the region is derived from the second dataset.

17. The article of claim 15, the storage medium storing instructions that when executed cause the computer to apply a neural networking technique to determine the correlation.

* * * * *